United States Patent [19]

Eliades et al.

[11] 4,129,589

[45] Dec. 12, 1978

[54] OVER-BASED MAGNESIUM SALTS OF SULPHONIC ACIDS

[75] Inventors: Theo I. Eliades; Ronald J. Muir; James D. Horner, all of Scarborough, Canada

[73] Assignee: Surpass Chemicals Limited, Scarborough, Canada

[21] Appl. No.: 892,978

[22] Filed: Apr. 3, 1978

Related U.S. Application Data

[63] Continuation of Ser. No. 705,678, Jul. 15, 1976, abandoned.

[51] Int. Cl.$^2$ .................... C07B 13/00; C07C 143/24; C09K 3/00
[52] U.S. Cl. .......................... 260/504 A; 260/505 N; 252/395
[58] Field of Search ....................... 260/505 N, 504 A

[56] References Cited

U.S. PATENT DOCUMENTS

| | | |
|---|---|---|
| 2,739,124 | 3/1956 | Otto et al. ...................... 260/505 N |
| 2,739,125 | 3/1956 | Meyers et al. .................. 260/504 A |
| 2,839,470 | 6/1958 | Warnen et al. .................. 260/504 A |
| 3,027,325 | 3/1962 | McMillen et al. ............... 260/504 A |

Primary Examiner—A. Siegel

[57] ABSTRACT

A process for preparing an over-based, oil-soluble magnesium salt of a sulphonic acid comprises contacting an acidic gas in the presence of a promoter system with a mixture of an oil-soluble magnesium salt of a sulphonic acid, a light magnesium oxide and an inert diluent. The promoter system comprises (1) a carboxylic compound selected from the group of compounds consisting of lower carboxylic acids, lower carboxylic anhydrides, substituted lower carboxylic acids, and metal salts and esters of lower carboxylic acids, (2) water, and optionally (3) a lower alkanol or lower alkoxy alkanol. The reaction is carried out at a temperature ranging from approximately 50° F up to reflux temperature of the mixture. The volatile components are stripped from the reaction mixture after absorption of the acidic gas is at a desired level to give an over-based, oil-soluble magnesium salt of the sulphonic acid.

29 Claims, No Drawings

OVER-BASED MAGNESIUM SALTS OF SULPHONIC ACIDS

This is a continuation of application Ser. No. 705,678 filed July 15, 1976 now abandoned.

FIELD OF INVENTION

This invention relates to over-based, oil-soluble magnesium salts of sulphonic acids having metal ratios ranging from 5 up to 40 or more and processes for preparing such over-based magnesium salts of sulphonic acids.

BACKGROUND OF THE INVENTION

Over-based, oil-soluble magnesium salts of sulphonic acids are used as additives in oil-based compositions, such as lubricants, greases, fuels, and the like. They function as detergents and acid neutralizers, thereby reducing wear and corrosion and extending the engine life.

Highly basic magnesium salts of a sulphonic acid having a metal ratio of equivalents of magnesium to equivalents of sulphonic acid ranging from 10 up to 40 or more, particularly the higher metal ratios of 20 to 40 have been difficult to prepare in a one-step operation using MgO as a Mg source. In systems previously described, either insufficient magnesium was dispersed or an unfiltered product resulted.

It has been discovered that over-based magnesium sulphonates may be prepared in a one-step operation by using a reaction promotor system comprising (1) a carboxylic compound selected from the group of compounds consisting of lower carboxylic acids, lower carboxylic anhydrides, substituted lower carboxylic acids, metal salts and esters of lower carboxylic acids and mixtures thereof, all having from 1 to 5 carbon atoms; (2) water and optionally (3) an alcohol selected from the group of compounds consisting of lower alkanols, lower alkoxy alkanols and mixtures thereof, all having from 1 to 5 carbon atoms. Such a promotor system gives a high quality over-based magnesium sulphonate having very high metal ratios which is suitable for use in various types of oil-based compositions.

It is therefore an object of the invention to provide a process for manufacturing oil-soluble, over-based magnesium salts of sulphonic acids having metal ratios ranging from 5 and upwards to 40 or more where the product is prepared in a one-step operation of contacting the reaction mixture with an acidic gas.

It is a further object of the invention to provide a reactor promoter system for use in processes for manufacturing oil-soluble, over-based magnesium salts of sulphonic acids having metal ratios of 10 up to 40 or more.

It is another object of the invention to provide a process for preparing a magnesium salt of a sulphonic acid having very high metal ratios wherein over-basing of the sulphonic acid is accomplished by using a promoter system in combination with a light form of magnesium oxide.

SUMMARY OF THE INVENTION

This invention provides a reaction promotor system for use in the manufacture of an over-based, oil-soluble magnesium salt of a sulphonic acid having metal ratios of up to 40 or more, in a one-step operation of contacting an acidic gas with a mixture containing the sulphonic acid to be over-based.

According to this invention, a process for preparing an over-based, oil-soluble magnesium salt of a sulphonic acid, comprises contacting an acidic gas with a mixture consisting essentially of:

(a) an oil-soluble magnesium salt of a sulphonic acid
(b) more than one equivalent up to approximately 40 equivalents of a light magnesium oxide per equivalent of sulphonic acid
(c) a promoter system comprising
  (1) from approximately 0.5 to approximately 5 equivalents of an essentially oil-insoluble carboxylic compound per equivalent of sulphonic acid, said carboxylic compound being selected from the group of compounds consisting of lower carboxylic acids, lower carboxylic anhydrides, substituted lower carboxylic acids, metal salts and esters of lower carboxylic acids and mixtures thereof, all having from 1 to 5 carbon atoms,
  (2) an amount of water up to approximately 30 equivalents of water per equivalent of sulphonic acid, and
  (3) from 0 to approximately 35 equivalents of an alcohol per equivalent of sulphonic acid, the alcohol being selected from the group of compounds consisting of lower alkanols, lower alkoxy alkanols, and mixtures thereof, all having from 1 to 5 carbon atoms
(d) an inert solvent for lowering and viscosity of the mixture to facilitate mixing.

The acidic gas is contacted with the mixture at a temperature ranging from approximately 50° F. up to reflux temperature of the mixture. The volatile components are stripped from the reaction mixture after absorption of the acidic gas by the reaction mixture is at a desired level to give an over-based, oil-soluble magnesium salt of a sulphonic acid. The reaction mixture may be filtered either before or after the stripping of the volatile components to give the product in solution or in concentrated form.

Additional water and/or alcohol may be added continuously or portion-wise to the reaction mixture during the time that the acidic gas is contacted with the mixture. The amount of water used in total should not exceed 30 equivalents per equivalent of sulphonic acid and the total amount of alcohol used should not exceed 35 equivalents per equivalent of sulphonic acid.

DETAILED DESCRIPTION OF THE PREFERRED EMBODIMENTS

The aforementioned, and other objects, advantages and features of the invention will become apparent in the following detailed discussion of preferred embodiments according to this invention. It is understood that the following preferred embodiments are not to be interpreted as limiting the scope of the invention.

Promoter System

The essentially oil-insoluble carboxylic compound is represented by the formula:

XCOOY wherein X is H, $-CH_2OH$, $-CH_2Cl$, $-CH_2Br$, $-CH_2COCH_3$, R or $RNH_2$ and Y is H, R, or $M_n$  where R is an alkyl radical of from 1 to 4 carbon atoms, the sum of all the carbon atoms in the R radicals not exceeding 5, and $M_n$ is an alkali or alkaline earth metal atom wherein n is an integer of 1 or 2.

Preferred oil-insoluble carboxylic compounds of this invention are acetic acid, propionic acid, butanoic acid, glycine, chloroacetic acid, bromoacetic acid, glycolic acid, ethyl acetoacetate, sodium acetate, calcium acetate, and magnesium acetate. These compounds may be used individually or in combination with one another where the amount of this promoter ranges from 0.5 up to 5 equivalents per equivalent of oil-soluble sulphonic acid. Preferably, the amount ranges from 0.7 to 1.3 equivalents. It has been found in most instances that if over 5 equivalents of the promoter are used, the reaction mixture becomes very viscous and although a product is obtained, the viscosity of the mixture makes the isolation of the product and the introduction of acidic gas into the mixture during the latter part of the process difficult.

The initial reaction mixture should have at least traces and preferably up to 2 equivalents of water per equivalent of sulphonic acid. The mixture may have up to 15 equivalents of water where the preferred range in the initial mixture is from 2 to 8 equivalents of water per equivalent of sulphonic acid.

Although the mechanism of the reaction is not fully understood, it is theorized that the presence of water in the reaction mixture initiates absorption of the acidic gas by the reaction mixture. There is, however, a competing reaction for the water in the formation of hydroxides of the magnesium oxide. It is therefore preferred to minimize the reaction of water with the magnesium oxide by carrying out additions of small amounts of water to the reaction mixture during the time that the acidic gas is contacted with the reaction mixture so as to ensure that water is available in the system to promote the absorption of the acidic gas. The amount of water used determines to a certain extent the value of the metal ratio in that higher amounts of water used gives a higher metal ratio; however, with higher amounts of water, there is usually a resultant haziness in the product. On the other hand, a deficiency of water causes higher viscosity in the reaction mixture and a lower metal ratio.

The total amount of water added to the mixture over the entire reaction time should not exceed 30 equivalents per equivalent of oil-soluble sulphonic acid used. The optimum amount of water to be used is determined by the amount of magnesium oxide used and the metal ratio desired because a larger amount of water results in a product having a higher metal ratio. Depending upon the end use of the product, it may be acceptable for the product to be hazy if used, for example, in bunker fuel oils and the like; however, higher clarity products are required in lubricating oils.

The alcohols used in this process include lower aliphatic alkanols, alkoxy alkanols, and mixtures thereof, where the number of carbon atoms does not exceed 5. Examples of the alcohols include methanol, ethanol, isopropanol, n-propanol, butanol, and pentanol. The preferred alcohol is methanol because of the low cost and ease of removal from the reaction mixture. Examples of the alkoxy alkanols include methoxy ethanol and ethoxy ethanol.

In order to initiate absorption of the acidic gas in the reaction mixture, it is not necessary to have an alcohol present in the initial mixture. It is believed, however, that the primary function of the alcohol is to promote the stability of the colloidial dispersion of magnesium salts in the oil. To this end there may be none or a small amount of alcohol in the initial reaction mixture and during the contacting with the acidic gas, further amounts of alcohol are added either separately or in combination with the addition of water. It has been found that lower metal ratios result if the total amount of alcohol to be added exceeds 35 equivalents per equivalent of sulphonic acid. The preferred amount to be used ranges from 4 to 20 equivalents per equivalent of sulphonic acid.

Sulphonic Acids

The sulphonic acids to be used in this process are those which are widely known by those skilled in the art as oil-soluble sulphonic acids. Such compounds may be derived from natural petroleum fractions or various synthetically prepared sulphonated compounds. Typical oil-soluble sulphonic acids which may be used include:

alkane sulphonic acids, aromatic sulphonic acids, alkaryl sulphonic acids, aralkyl sulphonic acids, petroleum sulphonic acids such as mahogany sulphonic acid, petroleum sulphonic acid, paraffin wax sulphonic acid, petroleum naphthene sulphonic acid, polyalkylated sulphonic acid, and other types of sulphonic acids which may be obtained by fuming sulphuric acid treatment of petroleum fractions. It is understood, of course, that mixtures of the sulphonic acids may be used in preparing an over-based magnesium sulphonate.

The process according to this invention is operative with low sulphonate concentrations which thereby allows the use of oil-based feed stock compositions containing as little as 10% by weight of magnesium sulphonate without further concentration of the oil-based stock.

Acidic Gas

As is appreciated by those skilled in the art, various types of acidic gases may be used in over-basing magnesium sulphonates. The preferred acidic gases are carbon dioxide, sulphur dioxide, nitrogen dioxide, and hydrogen sulphide. These gases are bubbled through the reaction mixture as it is being mixed so that the selected gas or gases become intimately mixed and in contact with the components of the reaction mixture.

The temperatures at which the contacting of the gas with the reaction mixture according to a preferred embodiment may vary from 50° to 200° F., although preferably within the 120° to 170° F, range.

MAGNESIUM OXIDE

The type of magnesium oxide used in a preferred embodiment of the process is the light or active form. Such magnesium oxides are sold under the trade marks: MAGNESITE, available from Martin Marietta Chemicals, Hunt Valley, Maryland; MICHIGAN No. 3, MICHIGAN No. 15, MICHIGAN No. 340, available from Michigan Chemical Corp, Chicago, Illinois; DOW L-2, DOW C-1, available from Dow Chemical Co., Midlane, Michigan; ELASTOMAG 170, and ELASTOMAG 20, available from Morton Chemical Co., Chicago, Illinois; MAGLITE Y, available from Whittacker, Clark and Daniels, South Plainfield, New York; LYCAL 93/711, and LYCAL 96/575, available from Pigment and Chemicals, Toronto, Canada; and MAGOX PREMIUM, available from Basic Chemical, Cleveland, Ohio. The amount of magnesium oxide used is dependent upon the metal ratio desired in the final product. The metal ratio is the ratio of the number of equivalents of magnesium in the over-based compound to the equivalents of sulphonic acid in the over-based compound. Therefore, to obtain a metal ratio of, for example, 30, there must be at least thirty equivilents of magnesium oxide per equivilent of sulphonic acid in the initial reaction mixture. It is apparent that when the reaction is carried out under less favourable conditions at lower efficiencies, an excess of magnesium oxide beyond that determined by the metal ratio should be used to ensure sufficient incorporation of magnesium with the structure of the over-based magnesium salt of the sulphonic acid.

INERT DILUENTS

Several different types of volatile and non-volatile diluents may be used in this process. The non-volatile diluents are generally mineral or synthetic lubricating oils, such as lubricating oils having a viscosity around 100 SUS at 100° F. or higher. The volatile diluents which are inert to the reaction are preferably hydrocarbons with boiling points ranging from 150° to 300° F. These can be aliphatic, aromatic, or a mixture of both types of solvents. For example, naptha is a particularly useful diluent. Other types of suitable diluents include Stoddard solvent, cycloaliphatic and aromatic hydrocarbons, and corresponding halogenated hydrocarbons, such as chlorobenzene, and other conventional organic diluents generally employed in the over-basing procedures in this particular art of manufacture. The amount of diluents used is sufficient to lower the viscosity of the reaction mixture to facilitate mixing thereof during the introduction and contacting of the acidic gases with the mixture.

The length of time that the acidic gas is contacted with the reaction mixture depends upon the desired level of magnesium in the over-based magnesium sulphonate. The contacting of the gas with the mixture may be continued until no further gas is absorbed to indicate that substantially all of the magnesium oxide originally introduced into the system has been reacted to form an over-based magnesium sulphonate. To determine when the absorption of the gas is complete, the flow rate of the acidic gas being introduced is compared to the flow rate of the gas leaving the system. When the flow rate of leaving gas almost equals the flow rate of the introduced gas, then the absorption is substantially complete.

As can be appreciated by those skilled in the art, impurities and other variations in the selected petroleum feed stocks and magnesium oxides, according to this invention, can cause the resultant product to have slightly different metal ratios than that achieved in the following examples. These examples are intended to illustrate various aspects of the invention and are not intended to limit the scope of the invention in any way.

PREPARATION 1

An oil-soluble magnesium sulfonate was prepared by charging into a 1 liter reactor, equipped with stirrer, dropping funnel, thermometer, cooling and vent, 310 gm. of a solvent refined lubricating oil having a viscosity of 330 SUS at 100° F. and while stirring vigorously, 103 gm. of 25 percent by weight oleum was added dropwise over a half hour period. The temperature was maintained at 90°–110° F. The mixture was stirred for an additional 10 minutes and then quenched with 25 gm. water, 310 gm. VM&P naphtha was added and the mixture allowed to settle in a separatory funnel for 3 hours; 80 gm. spent acid was separated and removed. The organic naphtha layer was washed with 120 gm. water and the aqueous lower yellowish layer was separated and discarded. To the upper sulfonic acid/naphtha layer was added 100 gm. water, 10 gm. methanol and 8 gm. magnesium oxide. The mixture was stirred at 140° F. effecting neutralization of the sulfonic acid and allowed to stand. The bottom aqueous layer which separated was discarded and the naphtha layer was stripped of solvent and water to give a 30 wt.% solution of magnesium sulfonate in oil.

EXAMPLE 1

Into a 1000 ml. flask fitted with mechanical stirrer, thermometer, condenser, dropping funnel and a course cylindrical dispersion tube were charged 85 gm. of the magnesium sulfonate of Preparation 1, 25 gm. lubricating oil of 100 SUS viscosity at 100° F., 140 gm. naphtha and 30 gm. magnesium oxide (MAGNESITE #569). The mixture was heated to 130° F. and 6 gm. magnesium acetate was added. Heating was continued, and at 140° F. a mixture of water/methanol of 20 gm/16 gm. respectively was added dropwise through the dropping funnel over a period of 66 minutes. At the same time carbonation was initiated at 75 ml/min. and continued for 3 hours.

The product of carbonation was then filtered with the aid of diatomaceous filter aid. Water, methanol and naphtha were then stripped off by heating to 400° F., leaving a product which was clear and bright with a magnesium content of 9.2% which is equivalent to a metal ratio of 27.0.

EXAMPLE 2

The following reagents were mixed together in a 1000 ml flask fitted with mechanical stirrer, thermometer, condenser and a course cylindrical dispersion tube:

137g naphtha (B.P. 240°–290° F.)
8g methanol
4g water
32g lubricating oil
100gm magnesium sulfonate solution made up of 45% magnesium sulfonate, 42% lubricating oil, and 13% naphtha. The sulfonic acid used to make the magnesium sulfonate is a straight chain alkyl benzene sulfonic acid of molecular weight about 500 which may be obtained from Continental Oil
30g magnesium oxide sold under the trade mark MAGNESITE #569 available from Martin Marietta Co. (U.S.A.). and 5.25g glacial acetic acid.

The mixture was heated near its reflux temperature (150° F.) and carbon dioxide was introduced while mixing via the dispersion tube into the mixture at a flow rate of 100 ml/min. Carbonation was continued for 2½ hours, during which 8 gm. water and 8 gm methanol were added after 40 minutes of carbonation and further 4 gm of water and 8 gm methanol were added after 80 minutes of carbonation.

The product of the carbonation was filtered with the aid of diatomaceous filter aid. The volatile components of solvent, water, methanol and naphtha were stripped off by heating to 400° F. A stream of $CO_2$ was introduced to the heated mixture to remove the last traces of solvents. The final product thus obtained was a clear and bright oil soluble solution which contained 9.4% by weight magnesium, 26.5% by weight magnesium sulfonate and had a viscosity of 525 SUS at 210° F. The metal ratio of the product was 14.8.

EXAMPLE 3

This example illustrates the effect of temperature during carbonation. The exact procedure of Example 2 was followed except that the mixture was maintained at 90°–110° F. during carbonation. The final product was a clear and bright oil soluble solution which contained 6.9% by weight magnesium, 26.9% by weight magnesium sulfonate. The metal ratio of the product was 10.7.

EXAMPLES 4 to 7

The results of a series of experiments are listed in Table 1 which illustrates the effect on the metal ratio in varying the amounts of methanol and water used during the carbonation step. The procedure is as for Example 2 with water/methanol additions made at 0, 40 and 80 minutes during the carbonation step.

TABLE 1

| Example | Time of Water/Methanol Addition During Carbonation Minutes | Water gm. | Methanol gm. | Metal Ratio | % Mg by wt. of Product | Appearance |
|---|---|---|---|---|---|---|
| 4 | 0 | 8 | 16 | 16.3 | 9.8 | Hazy |
|   | 40 | 8 | 8 | | | |
|   | 80 | 8 | 8 | | | |
| 5 | 0 | 4 | 16 | 15.7 | 9.4 | Hazy |
|   | 40 | 8 | 8 | | | |
|   | 80 | 8 | 8 | | | |
| 6 | 0 | 4 | 8 | 16.3 | 9.8 | Hazy |
|   | 40 | 8 | 8 | | | |
|   | 80 | 8 | 8 | | | |
| 7 | 0 | 4 | 8 | 16.0 | 9.7 | Bright and Fluid |
|   | 40 | 8 | 8 | | | |
|   | 80 | 4 | 8 | | | |

EXAMPLES 8 TO 11

Table 2 summarizes results of a series of experiments which illustrates the effect of adding the water/methanol at different time intervals. The procedure used in each experiment is similar to that used in Example 2.

Table 2

| Example | Time of Water/Methanol Addition During Carbonation Minutes | Water | Methanol | Metal Ratio | % Mg by wt. of Product | Appearance |
|---|---|---|---|---|---|---|
| 8 | 0 | 4g | 8g | 15.5 | 9.3 | Sl. Haze |
|   | 30 | 8g | 8g | | | |
|   | 60 | 4g | 8g | | | |
| 9 | 0 | 4g | 8g | 15.5 | 9.3 | Bright and Fluid |
|   | 40 | 8g | 8g | | | |
|   | 80 | 4g | 8g | | | |
| 10 | 0 | 4g | 8g | 14.7 | 8.8 | Bright and Fluid |
|   | 50 | 8g | 8g | | | |
|   | 100 | 4g | 8g | | | |
| 11 | 0 | 4g | 8g | 14.2 | 8.5 | Bright and Fluid |
|   | 60 | 8g | 8g | | | |
|   | 120 | 4g | 8g | | | |

EXAMPLES 12 TO 23

This series of experiments illustrate the effect of the amount of promoter used in terms of product quality. The results of these experiments are summarized in Table 3. The procedure for each experiment is similar to that used in Example 2.

TABLE 3

| Example | Promoter: No. of Equivalents of (AcOH) per Equivalent of Sulfonic Acid | Metal Ratio | % Mg by wt. of Product | Appearance | viscosity at 210° F |
|---|---|---|---|---|---|
| 12 | 0 | .5 | — | Bright | — |
| 13 | .51 | 13.6 | — | Bright | — |
| 14 | .68 | 15.5 | 9.3 | Bright | 750 |
| 15 | .68 | 15.5 | 9.3 | Bright | 1200 |
| 16 | .68 | 15.5 | 9.3 | Bright | 1700 |
| 17 | 1.02 | 15.7 | 9.4 | Bright | 525 |
| 18 | 1.02 | 15.8 | 9.5 | Bright | 560 |
| 19 | 1.02 | 15.7 | 9.4 | Bright | 525 |
| 20 | 1.56 | 16.0 | 9.7 | Bright | 630 |
| 21 | 1.56 | 16.3 | 9.8 | Bright | 660 |
| 22 | 1.56 | 15.7 | 9.4 | Bright | 500 |
| 23 | 1.87 | 15.7 | 9.4 | Hazy | Viscous gel |

EXAMPLES 24 TO 29

Table 4 summarizes the results of a series of experiments which illustrate the use of different promoters. All conditions of the procedure in each experiment are similar to that used in Example 2 except for using an equivalent molar amount of the different promoters as listed.

TABLE 4

| Example | Promoter | Metal Ratio | Appearance |
|---|---|---|---|
| 24 | Acetic Acid | 16.3 | Bright, clear; fluid product |
| 25 | Glycine | 14.7 | Bright, clear; fluid product |
| 26 | Formic Acid | .7 | Hazy; fluid |
| 27 | Ammonium Acetate | — | Did not absorb $CO_2$ |
| 28 | Benzoic Acid | 10.9 | Viscous to solid |
| 29 | Ethylene Diamine Diformate | 11.2 | Bright, clear; fluid |

EXAMPLES 30 TO 33

These examples illustrate how the sulfonic acids affect the product quality when using this process for production of magnesium containing lubricating oils. The results of the experiments are summarized in Table 5. The procedure of each experiment is similar to that used in Example 2.

TABLE 5

| Example | Source of Magnesium Sulfonate Used | Basic Structure & Approximate Molecular Weight | Metal Ratio | Appearance |
|---|---|---|---|---|
| 30 | prepared from Union Carbide "Ucane H.A." | Straight Chain Alkyl Benzene M.W. 410 | 16.0 | Clear, bright; fluid |
| 31 | prepared from Continental Oil LMR6 Alkylate | Straight Chain Alkyl Benzene M.W. 400 | 16.5 | Clear, bright; fluid |
| 32 | Esso France SA 119 | Branched chain Alkyl Benzene approx. M.W. 430 | 15.8 | Very viscous, heat promotes viscosity increase till product became solid |
| 33 | Edwin Cooper Sulfonic acid | Straight Chain Alkyl Benzene M.W. 380 | 15.7 | Low viscosity product, slight haze in hexane solution |

EXAMPLES 34 TO 46

The results of these experiments are summarized in Table 6 to illustrate the effect on the product obtained by using different commercially available magnesium oxides. The procedure in each experiment is similar to that of Example 2.

TABLE 6

| Example | Source of Magnesium Oxide | Metal Ratio | Appearance |
|---|---|---|---|
| 34 | Magnesite 369 | 17.4 | Viscosity increase during reaction; product very hazy |
| 35 | Magnesite 569 | 17.1 | Bright and fluid |
| 36 | Michigan No. 3 | 17.3 | Viscous during reaction |
| 37 | Michigan No. 15 | | Solidifies during reaction |
| 38 | Dow L-2 | 18.6 | Increase in viscosity during reaction; product hazy |
| 39 | Dow C-1 | 14.5 | Viscosity increase during initial stage of reaction; product exc. |
| 40 | Elastomag 170 | 16.7 | Viscosity increase during initial stages of reaction; product hazy |
| 41 | Magox Premium | | Solidifies during reaction |
| 42 | Licothion Tab (China) | | Viscosity increase during reaction; solidifies on stripping |
| 43 | Elastomag 20 | 17.8 | Viscosity increase during initial stage of reaction; product hazy |
| 44 | Maglite Y | 16.9 | Hazy product |
| 45 | Lycal 93/711 | 12.2 | Product hazy |
| 46 | Lycal 96/575 | | Solidifies during reaction |

EXAMPLES 47 TO 49

These experiments illustrate the use of different lower alcohols in the procedure of Example 2. The results of the experiments are summarized in Table 7.

TABLE 7

| Example | Alcohol | Metal Ratio | Appearance |
|---|---|---|---|
| 47 | Isopropanol | 12 | Slight haze, and fluid product |
| 48 | N-pentanol | 8 | Slight haze, and fluid product |
| 49 | Methoxy ethanol | 12 | Hazy and fluid product |

It can be appreciated from the results of these experiments that high quality, over-based magnesium salts of sulphonic acids may be manufactured and used as additives in lubricating oils, greases and other types of oil-based products, such as fuel oils, bunker oils, etc. where the metal ratio of the additives are in the range of 5 to 40. The products are permanently soluble in many organic environments and therefore find application as additives in the field of lubricants and fuels.

Although various preferred embodiments of the invention have been described herein in detail, it will be appreciated by those skilled in the art that variations may be made thereto without departing from the spirit of the invention or the scope of the appended claims.

The embodiments of the invention in which an exclusive property or privilege is claimed are defined as follows:

1. A process for preparing an over-based oil-soluble magnesium salt of a sulfonic acid having a metal ratio of approximately 10 to approximately 40; comprising contacting carbon dioxide gas with a mixture comprising:
   (a) an oil-soluble magnesium salt of a sulfonic acid,
   (b) more than ten equivalents up to approximately 40 equivalents of a light magnesium oxide per equivalent of sulfonic acid,
   (c) a promoter system comprising:
      (1) from approximately 0.5 to approximately 5 equivalents of an essentially oil-insoluble carboxylic compound per equivalent of sulfonic acid, said compound being selected from the group of compounds consisting of lower carboxylic acids, substituted lower carboxylic acids, and mixtures thereof, all having from 1 to 5 carbon atoms,
(2) from approximately 2 to approximately 30 equivalents of water per equivalent of sulfonic acid, and
(3) from 0 to approximately 35 equivalents of an alcohol per equivalent of sulfonic acid, said alcohol being selected from the group of components consisting of lower alkanols, lower alkoxy alkanols and mixtures thereof, all having from 1 to 5 carbon atoms, and
(d) an inert solvent for lowering the viscosity of said mixture to facilitate mixing;
said contacting being conducted at a temperature ranging from approximately 50° F. up to reflux temperature of said mixture, the volatile components being stripped from the reaction mixture after absorption of the carbon dioxide gas by the reaction mixture is at a desired level to give an over-based, oil-soluble magnesium salt of a sulfonic acid.

2. A process of claim 1 wherein approximately 0.7 to 1.3 equivalents of the carboxylic compound are used.

3. A process of claim 1 wherein, additional water of from 2 up to approximately 30 equivalents being added to the mixture during the time that carbon dioxide gas is contacted with the mixture.

4. A process of claim 1 wherein a sufficient amount of a selected alcohol is present in said mixture to initiate absorption of the carbon dioxide gas, additional water of from 2 to 30 equivalents and a selected alcohol in an amount of up to 35 equivalents being added to said mixture during the time that the carbon dioxide gas is contacted with the mixture.

5. A process of claim 3 wherein the amount of water present in the mixture prior to contacting the mixture with carbon dioxide gas ranges from approximately 2 to approximately 15 equivalents.

6. A process of claim 3 wherein the amount of water present in the mixture prior to contacting the mixture with carbon dioxide gas ranges from approximately 2 to approximately 8 equivalents.

7. A process of claim 4 wherein the total amount of alcohol used ranges from approximately 4 to approximately 20 equivalents.

8. A process of claim 1 wherein said alcohol is selected from the group consisting of methanol, ethanol, isopropanol, n-propanol, butanol, pentanol, methoxy ethanol, and ethoxy ethanol.

9. A process of claim 1 wherein said carboxylic compound is represented by the formula:

XCOOY wherein X is H, —CH$_2$OH, —CH$_2$Cl, —CH$_2$Br, —CH$_2$COCH$_3$, R, or RNH$_2$ and Y is H, R, or M$^n$ where R is an alkyl radical of from 1 to 4 carbon atoms, the sum of all the carbon atoms in the R radicals not exceeding 5, and M$^n$ is an alkali or alkaline earth metal atom wherein n is an integer of from 1 to 2.

10. A process of claim 9 wherein said carboxylic compound is selected from the group consisting of acetic acid, propionic acid, butanoic acid, glycine, chloroacetic acid, bromoacetic acid, glycolic acid, ethyl acetoacetate, sodium acetate, calcium acetate, magnesium acetate and mixtures thereof.

11. A process of claim 10 wherein said compound is acetic acid.

12. A process of claim 10 wherein said compound is magnesium acetate.

13. A process of claim 10 wherein said compound is glycine.

14. A process of claim 11 wherein said alcohol is methanol.

15. A process of claim 12 wherein said alcohol is methanol.

16. A process for preparing an over-based, oil-soluble magnesium salt of a sulfonic acid comprising contacting carbon dioxide at a temperature ranging from 50° F. to 200° F. with a mixture comprising:
(a) an oil-soluble magnesium salt of a sulfonic acid,
(b) from approximately 10 up to approximately 40 equivalents of a light magnesium oxide per equivalent of sulfonic acid,
(c) a promoter system comprising
(1) from approximately 0.5 to approximately 5 equivalents of an essentially oil-insoluble carboxylic compound per equivalent of sulfonic acid, said compound being selected from the group of compounds consisting of lower carboxylic acid, lower carboxylic anhydrides, substituted lower carboxylic acids, metal salts and esters of lower carboxylic acids and mixtures thereof, all having 1 to 5 carbon atoms,
(2) from approximately 2 to approximately 8 equivalents of water per equivalent of sulfonic acid, and
(3) an amount of alcohol up to approximately 8 equivalents of alcohol per equivalent of sulfonic acid, said alcohol being selected from the group consisting of lower alkanols, lower alkoxy alkanols, and mixtures thereof, all having from 1 to 5 carbon atoms,
(d) an inert solvent for lowering the viscosity of said mixture to facilitate mixing,
additional water and alcohol being added to the reaction mixture during a portion of the time that carbon dioxide is being contacted with said mixture where the total amount of water in said mixture is less than 30 equivalents and the total amount of alcohol in said mixture is less than 35 equivalents, the volatile components being stripped from the reaction mixture after absorption of the carbon dioxide by the reaction mixture is at a desired level to give an over based oil-soluble magnesium salt of a sulfonic acid having a metal ratio of equivalents of magnesium to equivalents of sulfonic acid ranging from approximately 10 to approximately 40.

17. A process of claim 16 wherein the carbon dioxide is contacted with said mixture at a temperature ranging from 120° F. to 170° F.

18. A process of claim 16 wherein approximately 0.7 to 1.3 equivalents of said carboxylic compound are used.

19. A process of claim 16 wherein approximately 0.7 to 1.3 equivalents of a carboxylic compound selected from the group of compounds consisting of acetic acid, propionic acid, butanoic acid, glycine, chloroacetic acid, bromoacetic acid, glycolic acid, ethyl acetoacetate, sodium acetate, calcium acetate, magnesium acetate and mixtures thereof, are used.

20. A process of claim 19 wherein said carboxylic compound is acetic acid.

21. A process of claim 19 wherein said carboxylic compound is glycine.

22. A process of claim 16 wherein said alcohol is methanol and said reaction promoter is acetic acid.

23. A process of claim 16 wherein additional water and alcohol are added portion-wise to the reaction mixture during a portion of the time that the carbon dioxide is contacted by the mixture.

24. A process of claim 16 wherein additional water and alcohol are added periodically during a portion of the time that the carbon dioxide is contacted by the mixture.

25. A process of claim 16 wherein carbon dioxide is contacted with said mixture until absorption of carbon dioxide by said mixture is essentially complete.

26. An over-based, oil-soluble magnesium salt of a sulfonic acid having a metal ratio of approximately 10 up to approximately 40 prepared by the process of claim 1.

27. An over-based, oil-soluble magnesium salt of a sulfonic acid having a metal ratio of approximately 10 up to approximately 40 prepared by the process of claim 14.

28. An over-based, oil-soluble magnesium salt of a sulfonic acid having a metal ratio of approximately 10 up to approximately 40 prepared by the process of claim 15.

29. An over-based, oil-soluble magnesium salt of a sulfonic acid having a metal ratio of approximately 10 up to approximately 40 prepared by the process of claim 16.

* * * * *